Patented Nov. 24, 1925.

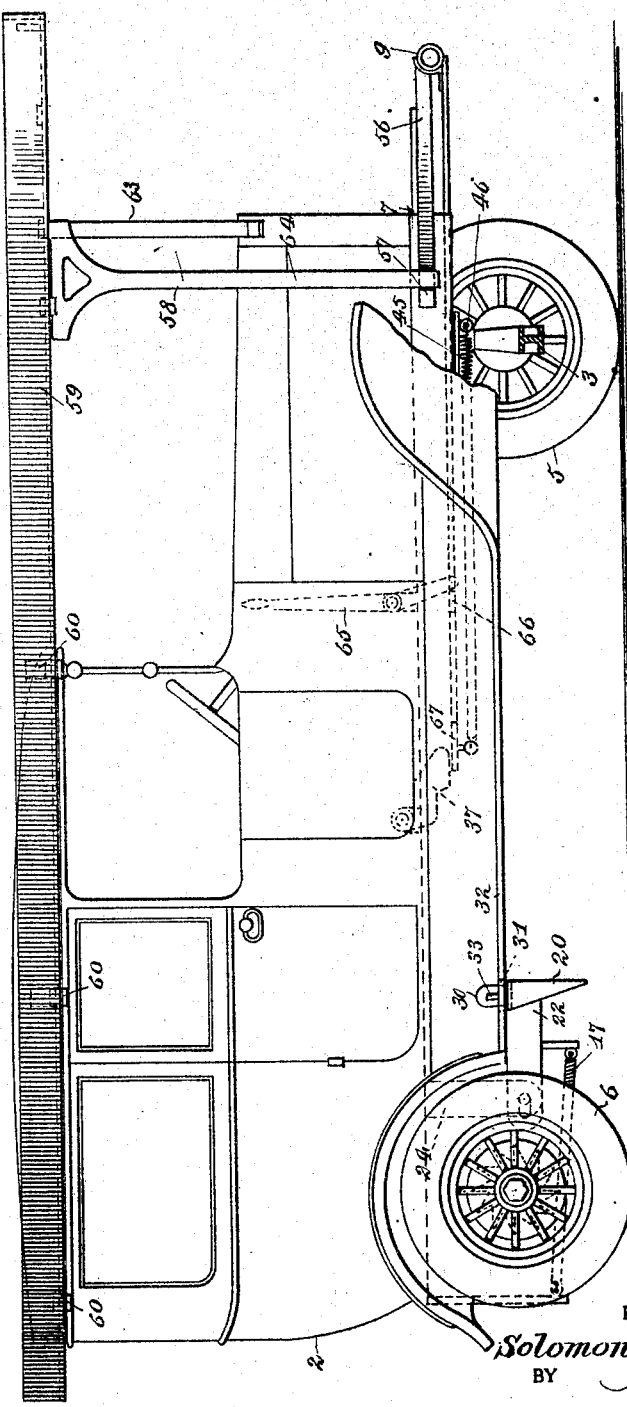

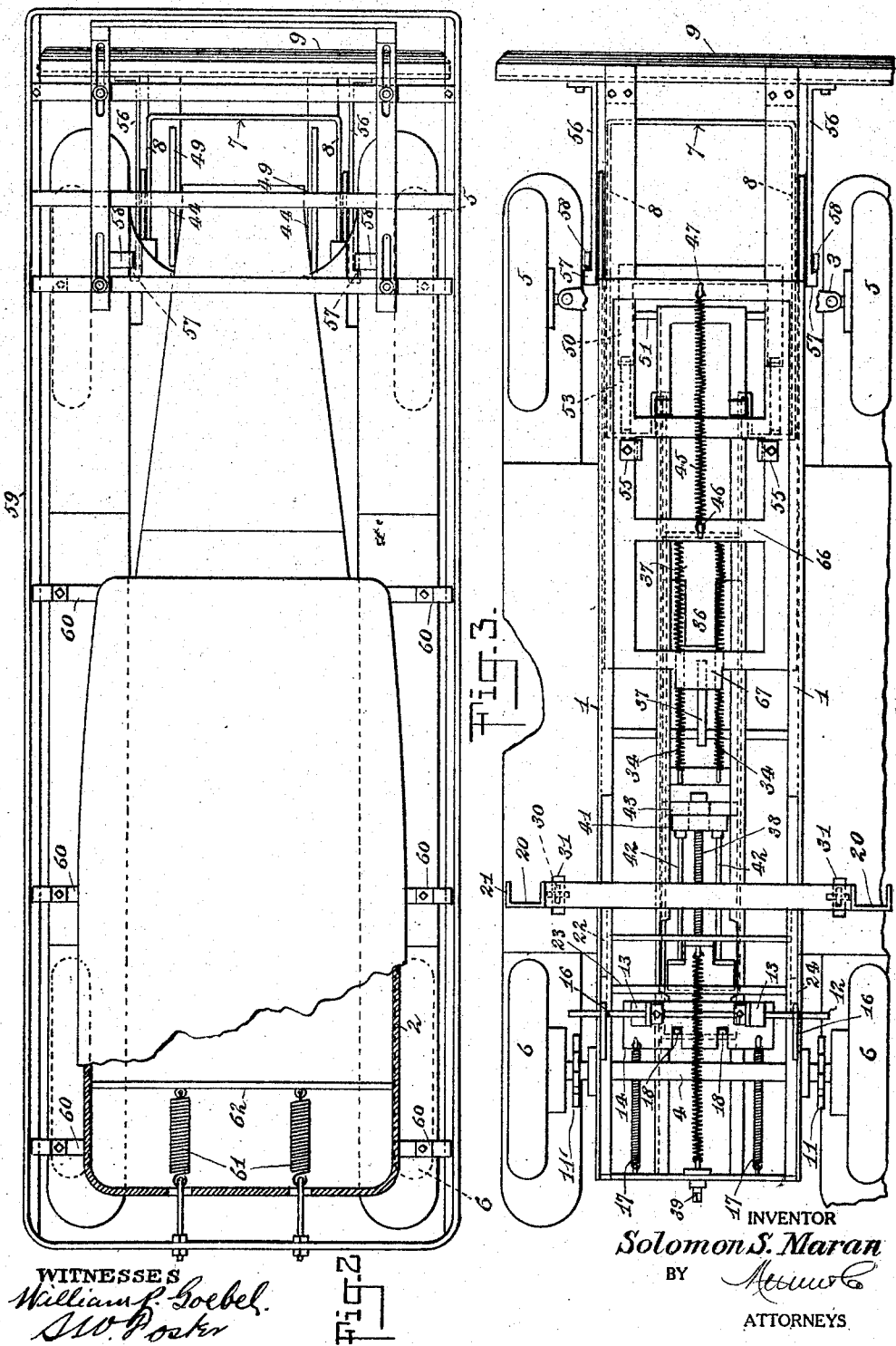

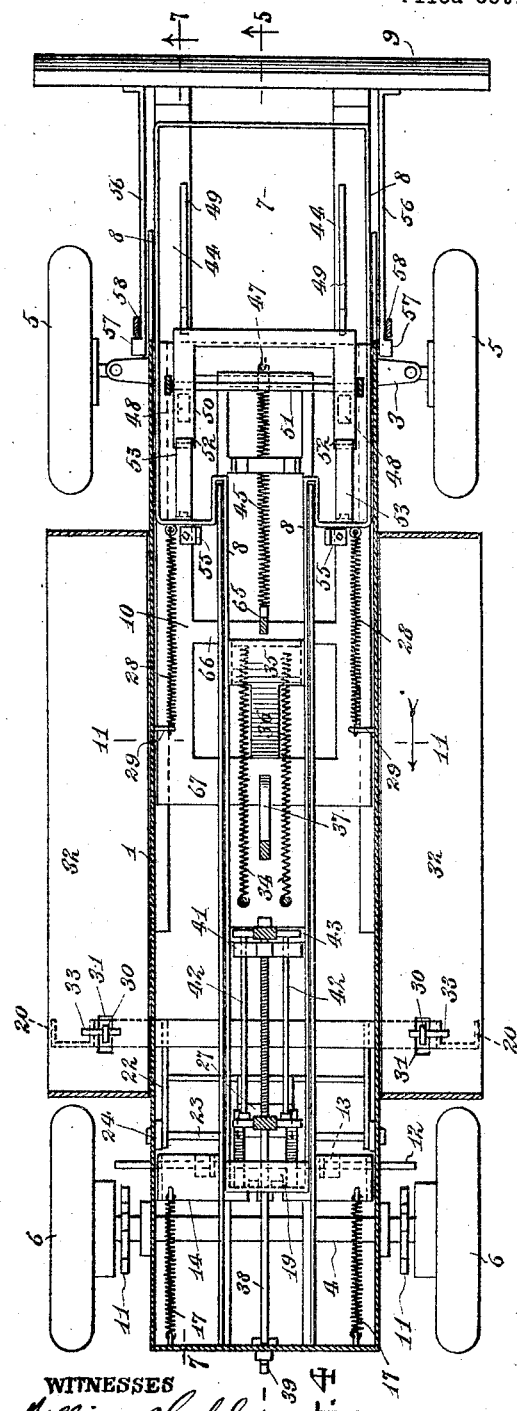

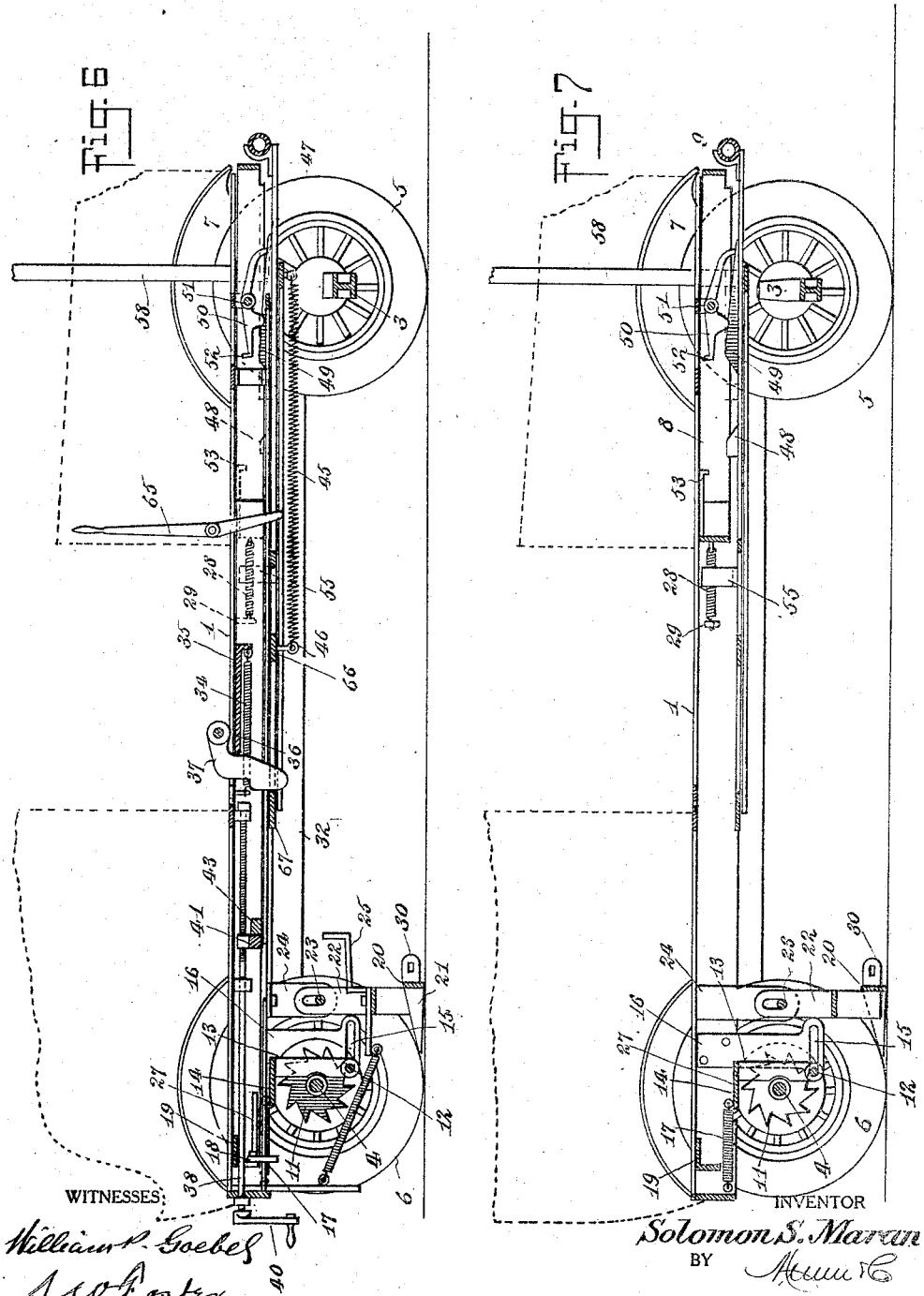

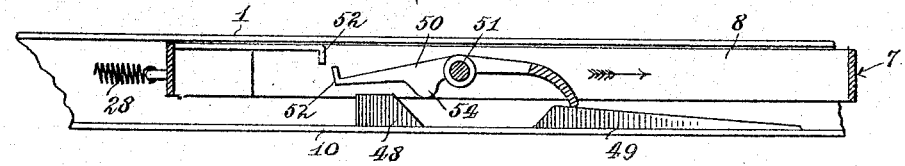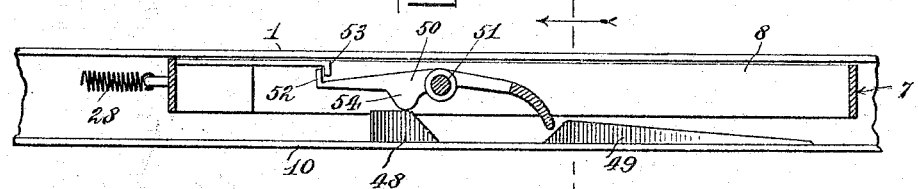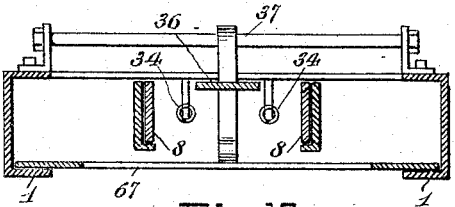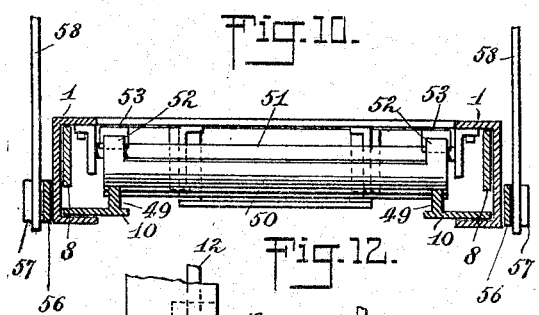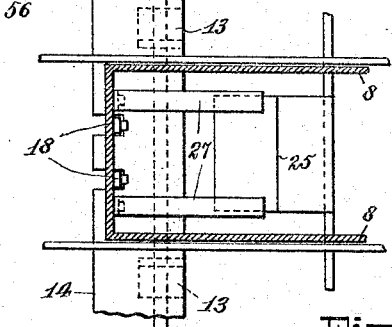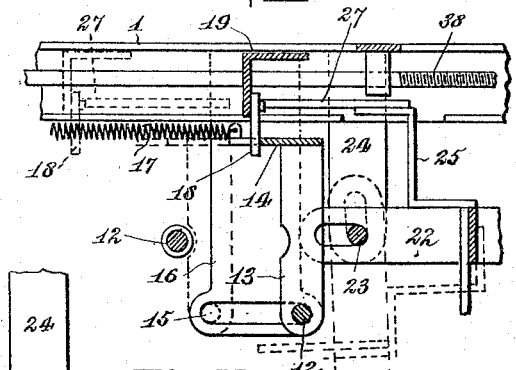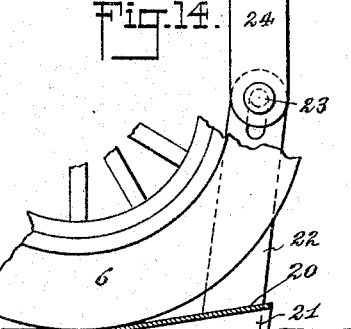

1,563,214

UNITED STATES PATENT OFFICE.

SOLOMON S. MARAN, OF NEW YORK, N. Y.

AUTOMOBILE.

Application filed October 25, 1924. Serial No. 745,926.

*To all whom it may concern:*

Be it known that I, SOLOMON S. MARAN, a citizen of the United States, and a resident of the city of New York, borough of Manhattan, in the county and State of New York, have invented a new and Improved Automobile, of which the following is a full, clear, and exact description.

This invention relates to automobiles, and the primary object of the invention is to prevent accidents with resultant injury to persons and property.

A further object is to provide an automobile with quick stopping mechanism caused to operate when either a bumper on the lower portion of the car, or a frame on the upper portion of the car comes into contact either with a person, a fixed object or another automobile.

My invention, therefore, relates to means employed on an automobile to bring the car to a quick stop without skidding and which stopping means is operated by any one of three devices, one device constituting a forwardly projecting bumper, another device a movable frame at the top of the car, and the third a manually movable device within convenient reach of the driver of the car.

With these and other objects in view, the invention consists in certain novel features of construction and combinations and arrangements of parts which will be more fully hereinafter described and pointed out in the claims.

In the accompanying drawings—

Figure 1 is a view in side elevation, partly broken away, illustrating my improvements as applied to an automobile of the limousine type although it is to be understood that the invention is applicable to any type of automobile;

Figure 2 is a top plan view, partly broken away and in section;

Figure 3 is an inverted plan view;

Figure 4 is a sectional plan view, the view being taken on the line 4—4 of Figure 5;

Figure 5 is a view in vertical longitudinal section on the line 5—5 of Figure 4;

Figure 6 is a view similar to Figure 5 and showing the parts in position to stop the car;

Figure 7 is a view with the parts in the position shown in Figure 6, the section being on the line 7—7 of Figure 4;

Figures 8, 9, 10, 11, 12, 13, 14 and 15 are fragmentary views illustrating various details of construction.

1 represents the chassis and 2 the body of an automobile. I have illustrated in the drawings a limousine type of automobile but would have it understood that the invention is adapted for use in connection with any type of car. The chassis 1 is supported upon front and rear axles 3 and 4, respectively, which are mounted in the front and rear wheels 5 and 6, respectively, as is customary in ordinary car construction.

The chassis 1 provides mounting and guiding means for a longitudinally movable setting frame 7. I employ this term "setting frame" to distinguish this part from other frames of the mechanism, and use the term because it is movable to a position to hold the car stopping means set and is also moved to release the car holding means. This setting frame is comparatively wide at its forward end and at its rear end is appreciably narrower and comprises a pair of parallel bars 8, 8.

9 represents a front crossbar which is preferably of tubular rubber and has the functions of an ordinary bumper, but in addition thereto functions as a contact device and is operatively connected to a tripping frame 44, the principal function of said tripping frame being to trip or release the setting frame 7 to allow the car stopping means to function.

For clearness of description I shall describe in detail, first, the car stopping mechanism, then the setting mechanism and then the tripping mechanism, all of which, of course, co-operate to give the desired results.

*Car stopping mechanism.*

Fixed to move with the rear wheel 6 is a pair of toothed wheels 11, and while I have shown these toothed wheels as fixed to the axles it is obvious that they may be operatively connected to move with the wheels in any approved manner.

While I have shown these wheels as ratchet wheels, in form they have no function of ratchet wheels other than the tendency to protect themselves from breaking the teeth in the event of undue strain of the interlocking rod 12. This interlocking rod 12 is carried by a pair of depending arms 13 which are fixed at their upper ends to a sliding plate 14. The rod 12 is movable in slots 15 in fixed brackets 16, and coil springs 17 connect the plate 14 with the fixed part of the car and exert a rearward pull thereon, tending to move the arms 13 rearwardly and the rod 12 into engagement with the teeth of wheels 11. These parts are, however, normally held in a forward position by means of a pair of depending fingers 18 fixed to a crossbar 19 carried by the setting frame 7 so that when this frame is in its normal set position the rod 12 will be out of engagement with the toothed wheels 11. This set position is illustrated in detail in Figure 13 and in plan in Figure 12.

In order to prevent possibility of skidding when the turning movement of the wheels is stopped by the engagement of rod 12 with the toothed wheels 11, I provide a pair of shoes 20 onto which the rear wheels 6 ride and are supported and function to embed the shoes into the pavement, as illustrated in detail in Figure 14. These shoes 20 are of somewhat wedge-shape with sharp front cornered flanges 21 at their side edges so that when the wheel rides onto the shoe its weight will embed the flanges into the pavement and absolutely prevent any possibility of skidding.

These shoes 20 are carried by links 22 which have slot and pin connection, as shown at 23, with fixed brackets 24. This slot and pin connection not only permits of the necessary pivotal or swinging movement of the links but it also allows for a certain amount of longitudinal movement of the links which is necessary for proper operation. The links 22 have angle brackets 25 fixed thereto and these angle brackets 25 are normally positioned under a plate 27 carried by the setting frame 7 so that when the setting frame is in its set position the links 22 will be in a horizontal position with the shoes 20 elevated, as indicated clearly in Figure 13. When the setting frame is moved rearwardly so that the plate 27 releases the brackets 25 the shoes 20 will move downwardly and rearwardly under the rear wheels, as indicated in Figure 4.

The car stopping means, therefore, not only includes a positive means for preventing turning movement of the wheels but it also includes the shoes which absolutely prevent forward movement by reason of skidding, and these two mechanisms insure the quick, almost instantaneous, stopping of the car.

With a view to providing means for holding the shoes 20 during the setting operation, I provide perforated lugs 30 on the shoes which may be projected through slots 31 in the running board 32, and while in this position removable pins 33 may be projected through the lugs above the running board and to hold the parts until properly set, when these pins 33 can be removed.

Setting mechanism.

The setting mechanism includes the frame 7 with its parallel bars 8 above referred to. A pair of coil springs 28 connects the forward enlarged portion of frame 7 with fixed lugs 29 on the car and exerts a rearward pull on the frame. These springs are, of course, under tension when the frame is in its forward position.

In addition to the springs 28 I provide a pair of stronger springs 34 which are connected at their rear ends to a fixed part of the car and at their forward ends to a plate 35 which is fixed to the parallel bars 8 and has a rearwardly projecting tongue 36 to engage a pivoted foot 37 for a purpose which will hereinafter appear.

The setting frame 7 is moved forwardly to set position by means of a longitudinally positioned rotary screw 38 located at the rear of the chassis and preferably made angular at its rear end, as shown at 39, to receive a crank arm 40 to turn the same as occasion may require. This screw is in operative position with a block 41 so that the block is caused to move forwardly and rearwardly in accordance with the direction in which the screw is turned. This block slides upon a pair of guide rods 42 and engages a crossbar 43 fixed at its ends to the parallel bars 8 of frame 7. Hence, when the screw is turned in a direction to move the block 41 forwardly it causes the entire frame 7 to move forwardly and bring the parts into set position. After the frame is set the screw is turned to bring the block 41 to its rearward position so as not to interfere with the rearward movement of the setting frame upon the operation of the mechanism.

Tripping mechanism.

The tripping mechanism includes a frame 44 located in a lower plane than the frame 7 and guided in its movements by fixed guides on the car. This frame at its forward end carries the bumper bar 9 above referred to, and a coil spring 45 connects a lug 47 on the setting frame 7 with a lug 46 on the tripping frame 44 so as to hold the tripping frame and the bumper bar 9 in a forward position. This spring 45 is relatively light so that it permits an easy rearward movement of the tripping frame and is overcome by the action of the springs 28 and 34 which are preferably stronger than the spring 45.

On the tripping frame 44 is a pair of aligned longitudinal webs 48 and 49 constituting cams, their function being to control a catch 50 pivotally mounted on a fulcrum 51 carried by a fixed part of the car structure. One end of this catch has a finger 52 adapted to engage behind a finger 53 on the setting frame 7 and couple the frames 7 and 44 together. When in this position an enlargement 54 on the catch 50 is located over the web 48 and held thereby in locking position. The web 49 constitutes a cam which when the tripping frame 44 is moved rearwardly functions to lift the free end of the catch 50 and release it from engagement with the setting frame, as clearly indicated in Figures 8 and 9 of the drawings. This web 48 also functions to pivot the latch into position for engagement with the finger 53 when the mechanism is moving toward set position, as shown in Figure 8.

A pair of brackets 55 is fixed to frame 44 and engages frame 7, as indicated in Figure 4, to limit the forward movement of the tripping frame and the bumper relative to the setting frame. Furthermore, the bumper is provided with a pair of rearwardly projecting arms 56 having shoulders 57 at their rear ends which are engaged by depending posts 58 fixed to a frame 59 supported at the top of the car. This frame 59 has some functions of a bumper and also a shield or guard and it constitutes in addition to such functions one element of the tripping mechanism. In other words, the contact of this frame 59 with another car or object causes the frame to move rearwardly and set in motion the car stopping means, as will more fully hereinafter appear.

This frame 59 is of general oblong shape. It is of sufficient length to protect not only the front and rear ends of the car but it is also sufficiently wide relative to the car body to receive contact of similar frames of other cars, as indicated most clearly in the plan view of Figure 2. The frame may be formed in various ways and is guided in its longitudinal movement by suitable guides 60 which, however, do not in any sense project outside of the outer surface of the frame 59 as it is desirable that this frame be entirely smooth so as to allow the frame of one car to slip readily along or off of a similar frame of another car in the event of collision or contact which might otherwise cause injury and damage.

The frame 59 is resiliently held in its forward position by springs 61 connecting the rear portion of the frame with a fixed part 52 of the car body. The mounting and guiding means of the frame 59 may be supported and strengthened by uprights 63 mounted upon the radiator 64 of the automobile. Also, it is to be understood that the invention is not limited to the particular construction of mounting but is broadly to the idea of this form of frame which co-operates with the tripping mechanism to cause the car to stop in the event of contact of the forward end with another car or fixed object. It will also be noted that the forward end of the frame 59 projects beyond the plane of the bumper 9 so that in the event of two cars coming together the frame 59 will move before the bumper 9 is engaged.

In addition to the automatic means above described for releasing the car stopping mechanism, I preferably provide some means within the car which may be manually operated. With this idea in view I provide a lever 65 located within the car in convenient reach of the operator, and at its lower end engaging a crossbar 66 on the setting frame.

I have referred to a foot 37 in the description above and will now set forth the function of this foot which is shown clearly in Figure 6. The foot is held in its normal position by means of a crossbar 67 on the tripping frame 44 and is in the path of movement of the arm 36 on plate 35. When the tripping frame moves rearwardly a short distance the foot 37 can fall by gravity against the front edge of the bar 67 so that when the arm 36 of plate 35 moves rearwardly it will contact with the foot 37 and cause the latter to swing rearwardly and carry with it the tripping frame 44 so as to draw the bumper bar rearwardly as far as deemed desirable.

The operation is as follows:
As above explained, to set the mechanism the screw 38 is operated to move the setting frame 7 forwardly. This also permits the tripping frame 44 to move forwardly, the catch 50 serving to couple the parts in their forward set position. At the same time, or just previous to this movement of the setting mechanism, the shoes 20 are elevated and the rod 12 moved forwardly, and these parts held in such position by the mechanism above described.

If the frame 59 is moved rearwardly or if the bumper 9 is moved rearwardly or if the lever 65 is operated, the tripping frame 44 will move rearwardly so as to release the catch 50 by reason of the cam 49, and the setting frame 7 will be drawn rearwardly by its springs, as above explained. When the frame 7 is drawn rearward by its spring 28 it engages the shoulders 55 and carries the frame 44 with it. This rearward movement of the setting frame releases the shoes 20 and the members holding the rod 12. Hence, the rod 12 will move into contact with the teeth of the wheels 11 and the shoes 20 will be positioned under the rear wheels. The car will then almost instantly come to a stop.

It will be noted that the bumper is extremely flexible in its mounting so that it cannot strike a person or object initially with sufficient force to do them an injury.

On the contrary, as soon as the bumper or the frame 59 comes into contact with a person or object they move rearwardly and, before any fixed part of the car can strike a person or object with sufficient force to kill or injure, the car will be brought to a stop by reason of the stopping mechanism above described.

This invention, therefore, embodies a construction and operative means which is designed to quickly stop the car and prevent accidents due to collision with persons or objects, and the inventor is, therefore, concerned in the saving of life and preventing serious injury which so commonly occurs with the use of automobiles as now constructed.

In order that the mechanism operate properly it is necessary that the front wheels be located back of the front of the radiator so that the wheels will not be engaged.

While specific details of construction are set forth and illustrated I would have it distinctly understood that I do not limit myself to the precise details set forth but consider myself at liberty to make such changes and alterations as fairly fall within the spirit and scope of the appended claims.

I claim:

1. In an automobile, the combination with stopping means therefor, a movable frame at the top of the car tripping means normally holding the stopping means out of operation, and means connecting the frame with the tripping means whereby a slight movement of the movable frame releases the tripping means and brings the car to a quick stop.

2. The combination with an automobile, of stopping means therefor, a movable bumper, and a movable frame surrounding the top of the car and movable longitudinally relative to the car, both or either of which adapted to operate the stopping means.

3. The combination with an automobile, of stopping means therefor, a movable bumper, a movable frame at the top of the car, and a manually operated means within the car, said bumper, said frame or said manually operated means adapted to operate the stopping means.

4. The combination with an automobile, stopping mechanism therefor, a setting frame normally holding the stopping mechanism out of operation, a tripping frame controlling the release of the setting frame, a bumper on the tripping frame, and a movable frame at the top of the automobile operatively connected to the tripping frame.

5. The combination with an automobile, stopping mechanism therefor, a setting frame holding the stopping mechanism out of operation, a screw adapted to move the setting frame to normal position, a tripping frame, a catch coupling the tripping and setting frames, a bumper on the tripping frame, springs exerting rearward pressure on both of said frames, and a movable frame at the top of an automobile coupled to the tripping frame whereby the rearward movement of either of said last-mentioned frames, or the bumper functions to release the setting frame and permit the setting mechanism to check the forward movement of the automobile 6. The combination with an automobile of stopping means therefor, a setting frame normally holding the stopping mechanism out of operation, a rearwardly movable resiliently held tripping frame, a bumper connected with the tripping frame, an upper frame movably mounted on the automobile and operatively connected to the tripping frame, a catch normally coupling the tripping frame and the setting frame, and a cam on the tripping frame functioning to release the catch when the tripping frame is moved rearwardly.

7. The combination with an automobile, of stopping mechanism therefor, a setting frame normally holding the stopping mechanism out of operation, a tripping frame, a pivoted catch, a cam on the tripping frame normally holding the catch in operative engagement with the setting frame, and a second cam on the tripping frame and adapted to release the catch when the tripping frame is moved rearwardly.

SOLOMON S. MARAN.